W. O. ROY.
CRATE AND SHOW BENCH.
APPLICATION FILED NOV. 27, 1908.
960,199.
Patented May 31, 1910.
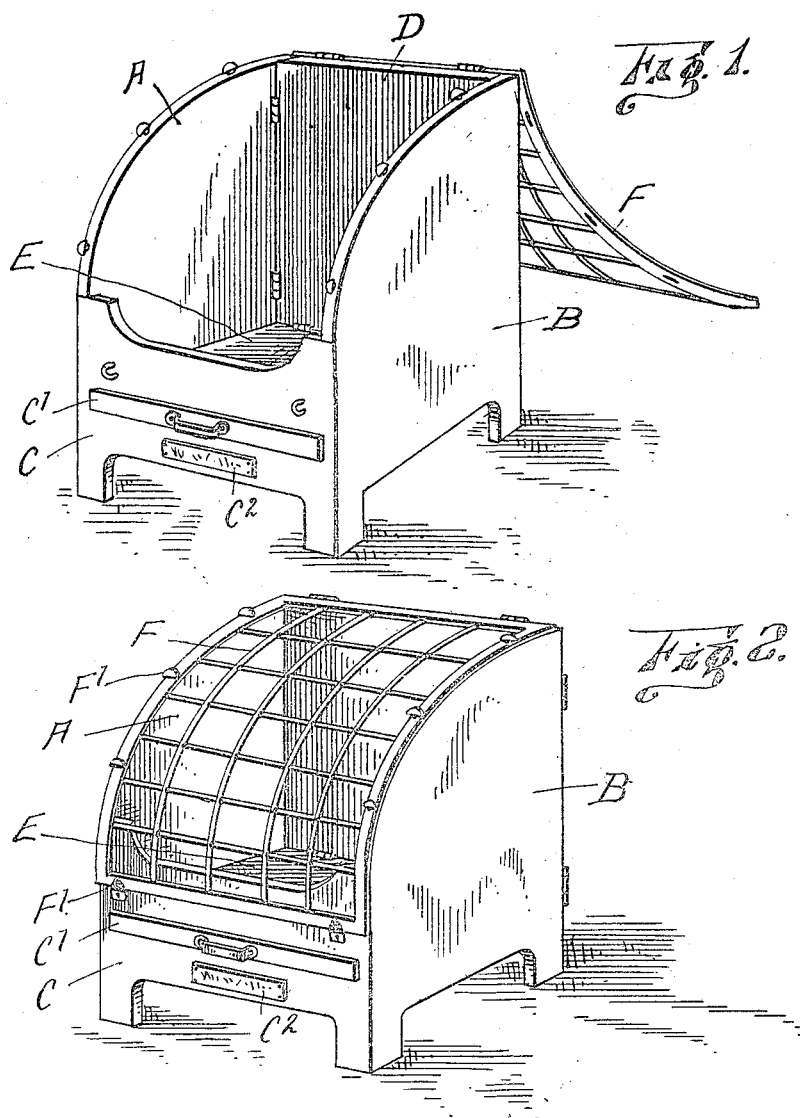

UNITED STATES PATENT OFFICE.

WILLIAM ORMISTON ROY, OF MONTREAL, QUEBEC, CANADA.

CRATE AND SHOW-BENCH.

960,199. Specification of Letters Patent. Patented May 31, 1910.

Application filed November 27, 1908. Serial No. 464,750.

*To all whom it may concern:*

Be it known that I, WILLIAM ORMISTON ROY, a subject of the King of Great Britain and Ireland, residing at 1050 Mount Royal avenue, in the city of Montreal, Province of Quebec, Dominion of Canada, have invented a new and useful Crate and Show-Bench, of which the following is a specification.

My invention relates to portable receptacles for animals exhibited at shows and has for its object the improvement in the handling, transporting and exhibiting of animals such as dogs, cats, poultry, etc.

Hitherto it has been the practice to transport such animals to exhibitions in crates of various shapes, sizes and construction and the animals have been transferred to partitioned benches which are frequently sent from place to place and liable to be improperly disinfected and thereby spread disease. The result of this system was, first, great expense in supplying the benches. Second, great danger in exposing the animals to infection on such benches. Third, expense and trouble of transferring the animals from one receptacle to another and then back again. Fourth, the trouble and expense of storage room for the empty crates during the exhibition. Fifth, the liability of error in transferring the animal from the bench to the wrong crate. To overcome these disadvantages I propose to provide a combined crate and show bench which will be built to standard sizes for various classes of exhibits and which will supply a shipping crate and at the same time a show bench. The result of adopting my invention at shows will be that owners will ship their exhibits in their own crates which can be properly disinfected and which on arrival at the show room will only require to be arranged in proper order. The return of the exhibits will be also accurate, rapid and safe.

In my detailed description reference will be made to the annexed drawing in which—

Figure 1, is a perspective view with cover off. Fig. 2, the same with cover on.

The device consists of the sides A, B, front C, and back D, which extend downward to form legs and a floor E, as shown. A cover of wire netting is securely attached to the top of the back and is provided with fastenings $F^1$, to attach its edges to the top of the sides and the front. A second cover of canvas or leather may be provided to fit over the wire cover.

By means of a door $C^1$, the front on the level of the floor, cleaning will be facilitated.

The crate may be arranged to collapse by joining the walls, back, front and floor by suitable hinges. The crate may also be provided with a name plate $C^2$, to contain the owner's name and address and the title of the exhibit.

When the crate is used for transporting an exhibit to or from a show, the cover is locked after the animal has been put in. On arrival at the show the crate is placed in its proper position and by means of unit benches in place of collective benches a more advantageous grouping can be effected and there need not be any empty benches. Should the animal be dangerous to the spectators the wire cover may be left in the closed position during the show. The entire cover will provide a protection from severe weather and can be made to cover the whole or only part of the wire cover.

I claim as new and desire to secure a patent on—

A show bench, comprising a front, sides, and back hinged together and formed with legs, a raised floor, the front having an opening therein on line with the floor, a door closing said opening, the back being higher than the front, a wire net door hinged to the upper edge of the back and being secured to the upper portion of the face of the front, and turn buttons on the upper edges of the sides for securing the said wire net door thereto.

Signed at Montreal, this seventeenth day of November 1908, in the presence of two witnesses.

WILLIAM ORMISTON ROY.

Witnesses:
HANBURY A. BUDDEN,
EMILY HAIL.